(12) United States Patent
Liu

(10) Patent No.: US 8,807,429 B2
(45) Date of Patent: Aug. 19, 2014

(54) RECOGNITION SYSTEM HAVING PERIODIC GUIDED-WAVE STRUCTURE

(75) Inventor: Hsien-Wen Liu, New Taipei (TW)

(73) Assignee: Auden Techno Corp., Taoyuan County (TW)

( * ) Notice: Subject to any disclaimer, the term of this patent is extended or adjusted under 35 U.S.C. 154(b) by 154 days.

(21) Appl. No.: 13/525,310

(22) Filed: Jun. 16, 2012

(65) Prior Publication Data

US 2013/0334310 A1  Dec. 19, 2013

(51) Int. Cl.
*G06Q 90/00* (2006.01)

(52) U.S. Cl.
USPC .......................................................... 235/385

(58) Field of Classification Search
USPC .......................................................... 235/385
See application file for complete search history.

*Primary Examiner* — Jamara Franklin

(74) *Attorney, Agent, or Firm* — Li&Cai Intellectual Property (USA) Office

(57) ABSTRACT

A recognition system is offered. The recognition system is for sensing a plurality of units under test of at least an object under test. The recognition system comprises a periodic guided-wave structure and a near field sensing device. The periodic guided-wave structure is disposed under the object under test and has a plurality of conductive units periodically arranged on a plane. The near field sensing device has a near field antenna and senses the plurality of units under test through detecting the near field magnetic field. The periodic guided-wave structure confines the electromagnetic field for facilitating to determine the distance from any one of the units under test to the periodic guided-wave structure.

10 Claims, 7 Drawing Sheets

US 8,807,429 B2

RECOGNITION SYSTEM HAVING PERIODIC GUIDED-WAVE STRUCTURE

BACKGROUND OF THE INVENTION

1. Field of the Invention

The instant disclosure relates to a recognition system; in particular, to a recognition system having a periodic guided-wave structure.

2. Description of Related Art

Radio frequency identification system (RFID system) is widely utilized to automation circumstances, such as a warehouse management, the mass production process or a transportation payment system. The RFID system may include a RFID reader and at least a RFID tag. On some conditions, it is better for the RFID reader to be designed to recognize more RFID tags.

Traditionally, the near field antenna of the RFID reader may produce vertical polarized magnetic field and horizontal polarized magnetic field, and the strength of the magnetic field (vertical polarized or horizontal polarized) varies due to the design manner of the near field antenna. Thus, the traditional near field antenna may be designed to recognize all of the RFID tags in a pre-defined reorganization area. For example, the RFID tags in different position or different direction relative to the RFID reader.

SUMMARY OF THE INVENTION

The object of the instant disclosure is to offer a recognition system having a periodic guided-wave structure for recognizing a plurality of units under test of an object under test, meanwhile, the distance from any one of the units under test to the periodic guided-wave structure.

In order to achieve the aforementioned objects, according to an embodiment of the instant disclosure, a recognition system is offered. The recognition system is for sensing a plurality of units under test of at least an object under test. The recognition system comprises a periodic guided-wave structure and a near field sensing device. The periodic guided-wave structure is disposed under the object under test and has a plurality of conductive units periodically arranged on a plane. The near field sensing device has a near field antenna and senses the plurality of units under test through detecting the near field magnetic field. The periodic guided-wave structure confines the electromagnetic field for facilitating to determine the distance from any one of the units under test to the periodic guided-wave structure.

In summary, the recognition system having a periodic guided-wave structure may sense a plurality of units under test on the object under test. The periodic guided-wave structure may confine the electromagnetic field for facilitating to determine the distance from each of the units under test to the periodic guided-wave structure.

In order to further the understanding regarding the instant disclosure, the following embodiments are provided along with illustrations to facilitate the disclosure of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 1:
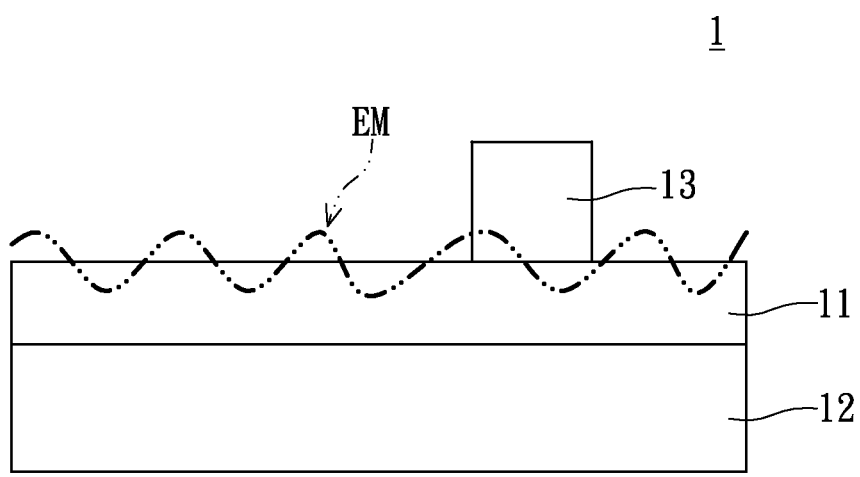
FIG. 1 shows a cross-sectional diagram of a recognition system according to an embodiment of the instant disclosure.

Please refer to FIG. 1 showing a cross-sectional diagram of a recognition system according to an embodiment of the instant disclosure. The recognition system 1 is utilized for sensing a plurality of units under test (not shown in the figure) of an object under test. The recognition system 1 comprises a periodic guided-wave structure 11 and a near field sensing device 12. Please also note that in order to describe the instant disclosure in an understandable and clear way, the near field sensing device 12 sensing the units under test disposed on one object under test (13) is described in this embodiment. The recognition system 1 may also sense a plurality of units under test disposed on (or installed in) a plurality of objects under test 13. The mentioned unit under test may be a RFID Tag, and the near field sensing device 12 may be a RFID reader.

The periodic guided-wave structure 11 is disposed under the object under test 13, and the near field sensing device 12 is disposed under the periodic guided-wave structure 11. The periodic guided-wave structure 11 has a plurality of conductive units 111 (shown in FIG. 2) periodically arranged on a plane. The periodic guided-wave structure 11 may confine the electromagnetic field EM. The mentioned plane is the horizontal plane. Thus, the unit(s) under test adhered to the periodic guided-wave structure 11 may be readily be recognized (or identified).

The near field sensing device 12 has at least a near field antenna. The near field sensing device 12 produces electromagnetic field through the near field antenna. When any one of the units under test (RFID Tags) of the object under test 13 receives the electromagnetic field produced by the near field sensing device 12, the unit under test (RFID Tag) may produce electromagnetic field representing the responding signals. The near field sensing device 12 may also has a signal processing circuit, such as a radio frequency circuit or a control circuit. An artisan of ordinary skill in the art will appreciate the implementation manner of the signal processing circuit, thus there is no need to go into details. The near field antenna of the near field sensing device 12 may be a loop antenna, the loop antenna may produce more uniform magnetic field with larger magnitude in near field. The near field antenna may produce stronger magnetic field in the aforementioned plane on which the conductive units are arranged (i.e., the H-field). However, the near field antenna may be different in types, and the near field antenna is not restricted thereto. According to the theory of leaky wave, when the periodic guided-wave structure 11 is disposed upon the near field antenna, the periodic guided-wave structure 11 may make the energy of the electromagnetic be distributed on the surface of the periodic guided-wave structure 11. The dimensions of the conductive units 111 and the distance between adjacent conductive units 11 may be adjusted for altering the ripple property. In other words, the periodic guided-wave structure 11 may confine the electromagnetic field on the surface of periodic guided-wave structure 11.

When the electromagnetic field representing the responding signals is received by the near field sensing device 12, the near field sensing device 12 could recognize the responding signals for identifying the units under test (RFID tag). The units under test may be active type or passive type. An active unit under test may have a battery for providing the operation power. A passive unit under test may produce electromagnetic field representing the responding signals according to the energy of receiving electromagnetic field. Therefore, the near field sensing device 12 may sense the units under test (not shown in the figure) for determining the distance from any one of the units under test to the periodic guided-wave structure 11.

In this embodiment, the near field sensing device 12 may determines which one of the units under test is closer to the periodic guided-wave structure 11 according to the sensed intensity of the responding signals (which is proportional to the magnitude of the electromagnetic field). For example, the near field sensing device 12 may classify the responding signals into two groups according to the intensity of the responding signals, such as a first group which represents the units under test adhered to (or near to) the periodic guided-wave structure 11 and a second group which represents the units under test not adhered to (or far to) the periodic guided-wave structure 11.

Figure 2:
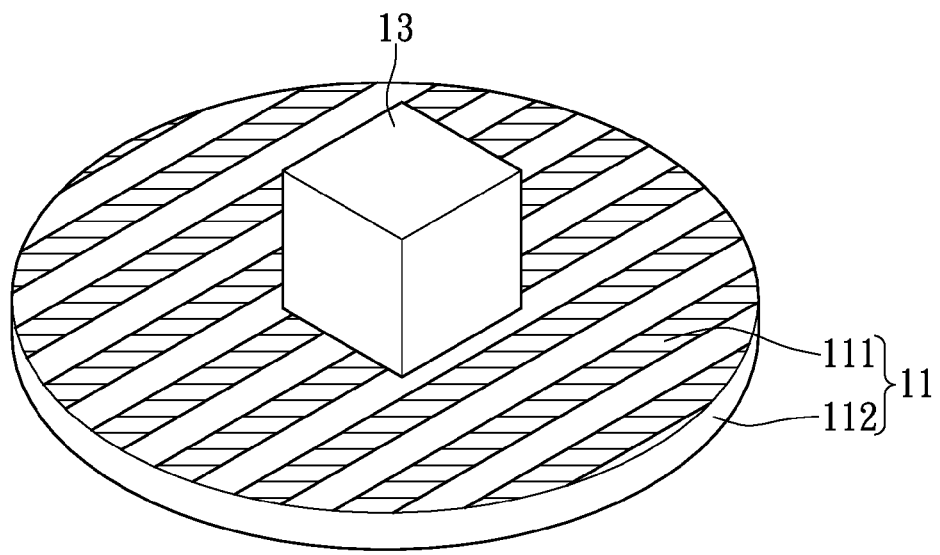
FIG. 2 shows a schematic diagram of a recognition system according to an embodiment of the instant disclosure.

Referring to FIGS. 1 and 2, FIG. 2 shows a schematic diagram of a recognition system 1. The appearance of the object under test 13 in FIG. 2 is a cube. The periodic guided-wave structure 11 has a plurality of conductive units 111 periodically arranged on a plane and a substrate 112 supporting the conductive units 111. A surface of the substrate 112 supports the conductive units 111, and the substrate 112 usually is non-conductive material which the electromagnetic field may penetrates the substrate. The units under test of the object under test 13 may be at any position in the cube. Therefore, the distance from the unit under test to the periodic guided-wave structure 11 may vary according to the position of the unit under test. In other words, the near field sensing device 12 may sense all of the units under test, and the near field sensing device 12 may also determine the distance from any of the units under test to the periodic guided-wave structure 12. In the following, the implement manner of the periodic guided-wave structure 11 would be illustrated paragraphs, and then the manner of the near field sensing device 12 sensing the units under test would be described.

Figure 3A:
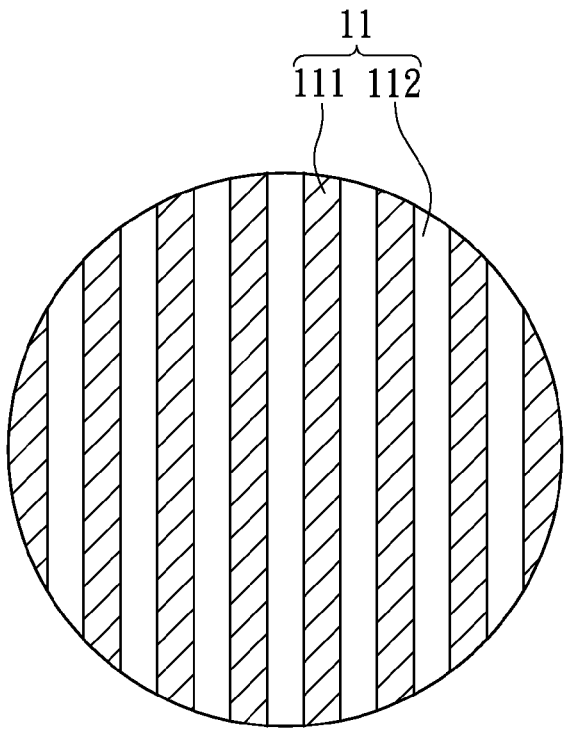
FIG. 3A shows a schematic diagram of a periodic guided-wave structure according to an embodiment of the instant disclosure.
Figure 3B:
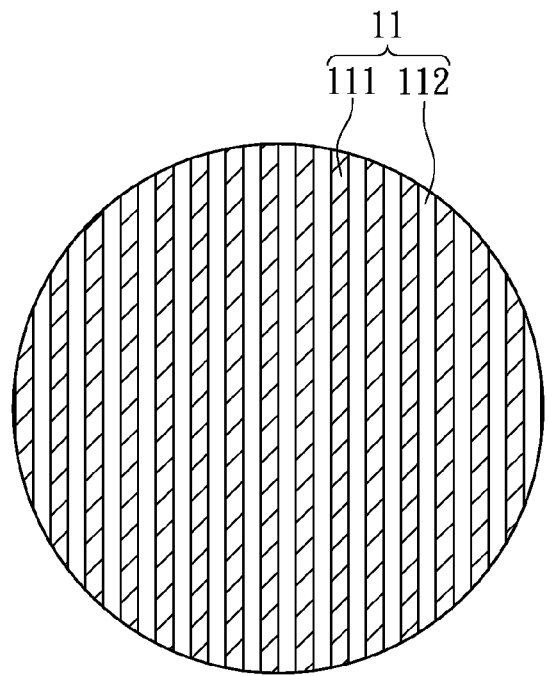
FIG. 3B shows a schematic diagram of a periodic guided-wave structure according to an embodiment of the instant disclosure.

Referring to FIGS. 3A, 3B, 3D and 3E, FIGS. 3A, 3B, 3D and 3E show schematic diagrams of the periodic guided-wave structure 11. The conductive units 111 of the periodic guided-wave structure 11 may be conductive bars in one-dimensional periodic arrangement. The conductive units 111 may be metal, such as copper, but the instant disclosure is not restricted thereto. It is worth mentioning that the shape of the conductive units 111 shown in FIG. 3A and FIG. 3B are exemplary. The long side edge of the conductive units 111 may be jagged, or arc-shaped, as long as the arrangement of the conductive units 11 results in a one-dimensional periodic structure. The shape of the conductive units 111 may lead electric current for guiding the energy of the magnetic field to the surface of the conductive units 11, thus the identification performance for the units under test adhered to the conductive units 111 could be enhanced.

Referring to FIGS. 3A and 3B again. In this embodiment, taking a recognition system with a near field antenna operating in 900 MHz for example, the distance between the conductive units 111 may be from 2 millimeters to 2 centimeters, and the thickness of the substrate 112 supporting the conductive units 111 may be 1 centimeter, however, the instant disclosure is not restricted thereto. In a preferred embodiment, the distance between two adjacent conductive units 111 may be 1 centimeter and the width of each of the conductive units 111 may be 1 centimeter. As shown in FIG. 3B, the distance (or spacing) between two adjacent conductive units 111 may be 0.5 centimeter and the width of each of the conductive units 111 may be 0.5 centimeter.

Figure 3C:
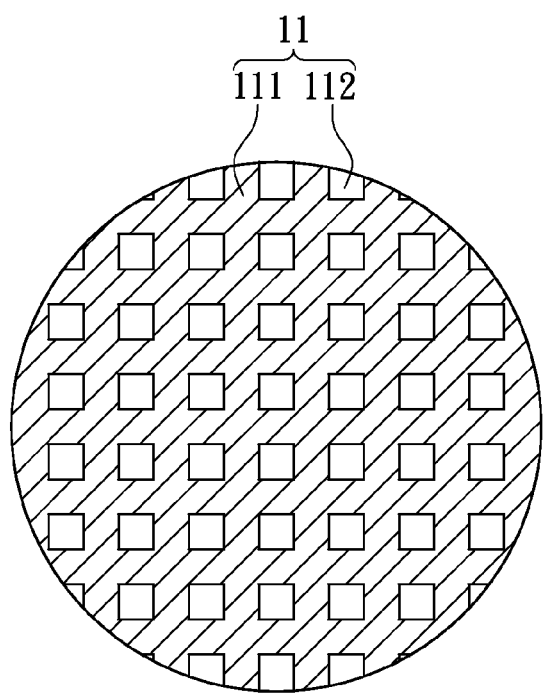
FIG. 3C shows a schematic diagram of a periodic guided-wave structure according to an embodiment of the instant disclosure.
Figure 3D:
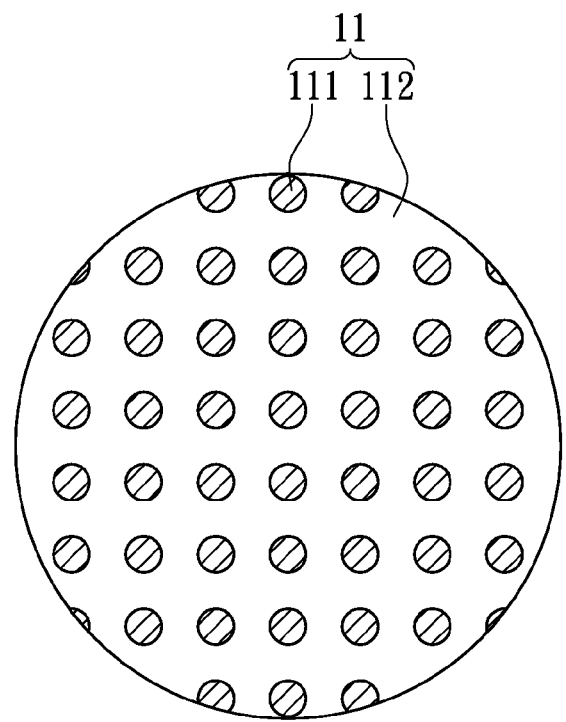
FIG. 3D shows a schematic diagram of a periodic guided-wave structure according to an embodiment of the instant disclosure.
Figure 3E:
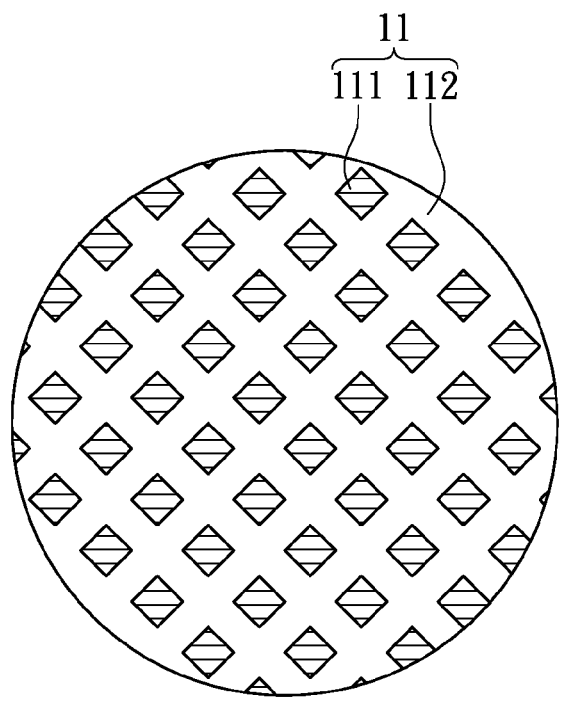
FIG. 3E shows a schematic diagram of a periodic guided-wave structure according to an embodiment of the instant disclosure.

Referring to FIGS. 3C, 3D and 3E, the conductive units 111 may be conductive grids or conductive patterns in two-dimensional periodic arrangement. FIG. 3C shows the conductive units 111 realized in conductive grids, and the grid size of the conductive grids may vary according to the operation frequency of the near field antenna. Comparing to FIG. 3, FIGS. 3D and 3E illustrate the conductive units 111 realized in conductive patterns, and the shape of the conductive patterns may be a disk or a diamond, as long as the conductive units 111 (conductive patterns) accomplish a two-dimensional periodic structure.

Figure 4:
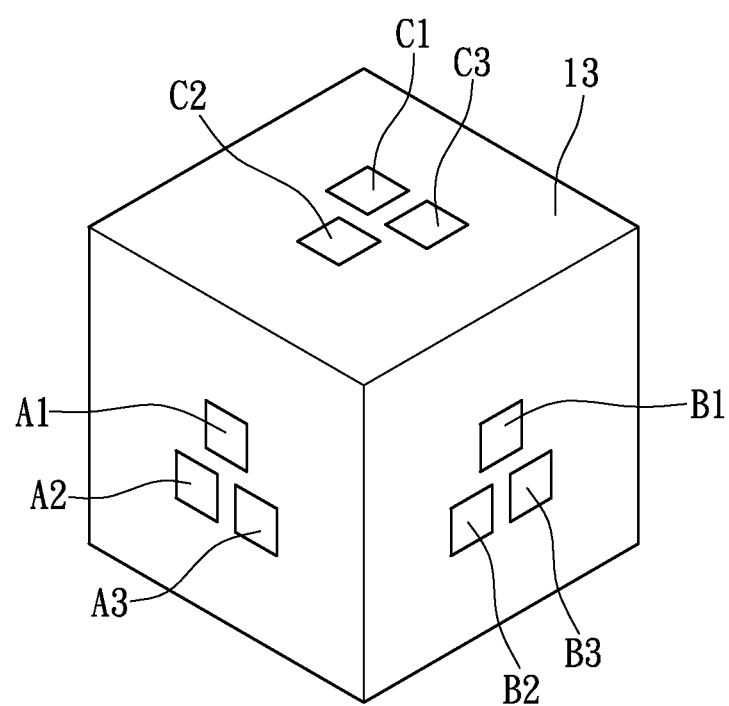
FIG. 4 shows a schematic diagram of an object under test according to an embodiment of the instant disclosure.

Referring to FIGS. 1 and 4, FIG. 4 shows a schematic diagram of an object under test 13. The recognition system 1 may be the dice recognition system or chips recognition system in casino or gambling house. Each surface of the object under test 13 may have a plurality of units under test (RFID tag). As shown in FIG. 4, each surface of the object under test 13 (dice) has three units under test. The units under test A1, A2 and A3 are on a surface (surface A) of the dice. The surface B has units under test B1, B2 and B3. The surface C has units under test B1, B2 and B3. Because the dice has six surface, the other three surface D, E and F (not shown in FIG. 4) have units under test D1, D2 and D3, units under test E1, E2 and E3, units under test F1, F2 and F3 respectively. When the units under test 13 (dice) is stationary on the periodic guided-wave structure 11 after rolling on the periodic guided-wave structure 11, a surface of the object under test 13 may be adhered to the periodic guided-wave structure 11, and the near field sensing device 12 may sense the units under test on the surface (of the object under test 13) adhered to the periodic guided-wave structure 11.

Figure 5A:
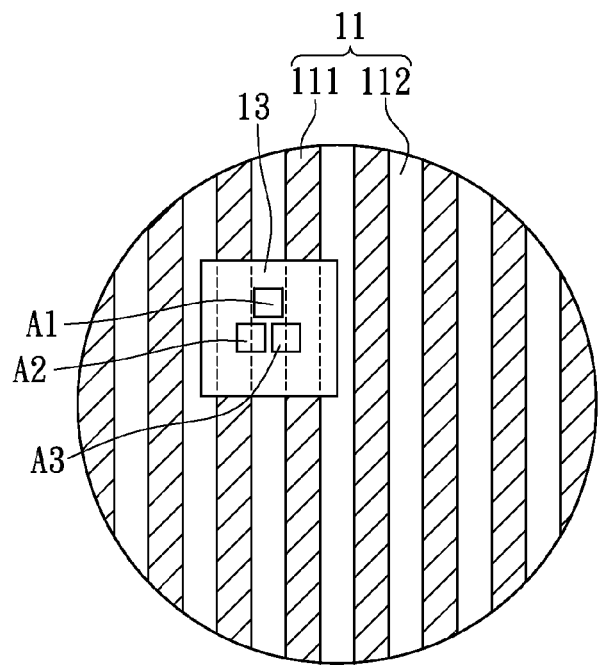
FIG. 5A shows a top view of an object under test disposed on a periodic guided-wave structure according to an embodiment of the instant disclosure.
Figure 5B:
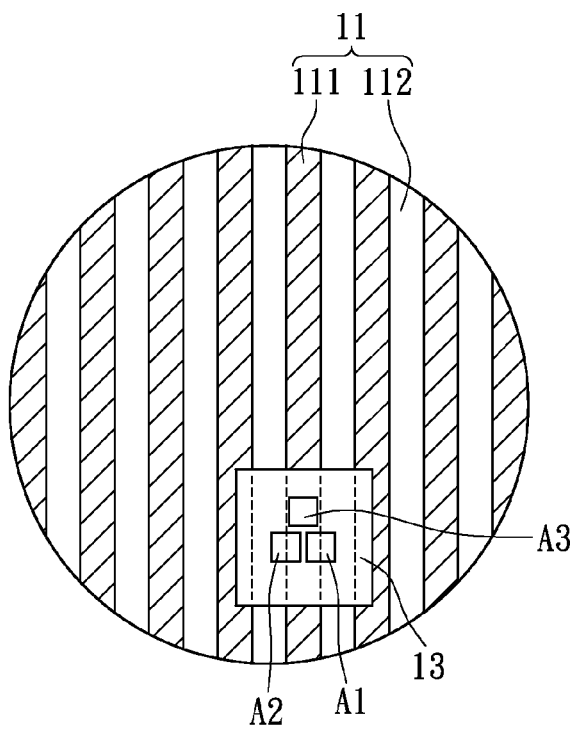
FIG. 5B shows a top view of an object under test disposed on a periodic guided-wave structure according to an embodiment of the instant disclosure.
Figure 5C:
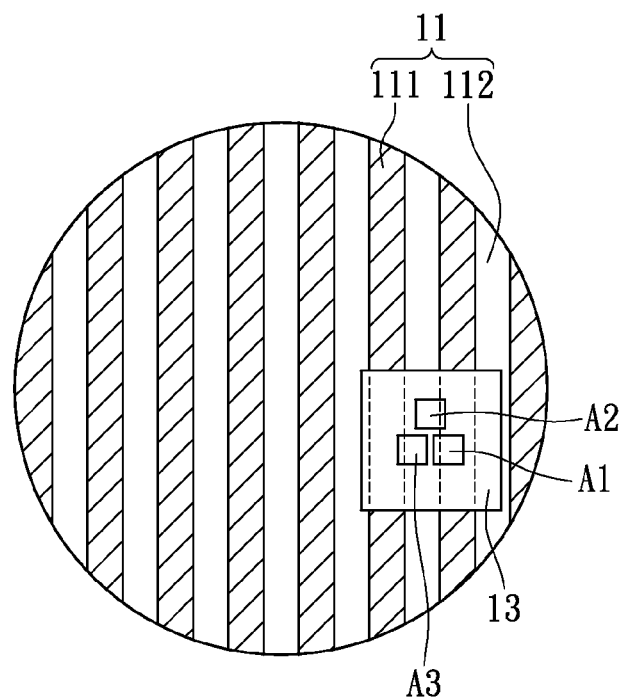
FIG. 5C shows a top view of an object under test disposed on a periodic guided-wave structure according to an embodiment of the instant disclosure.

Referring to FIGS. 5A, 5B and 5C, FIGS. 5A, 5B and 5C shows top views of an object under test 13 disposed on a periodic guided-wave structure 11. Take the conductive units 111 being conductive bars in one-dimensional periodic arrangement as an example, FIG. 5A shows the object under test 13 stays on the periodic guided-wave structure 11 while the surface A is adhered to the periodic guided-wave structure 11 (i.e., meanwhile, the surface A is the bottom surface of the dice in FIG. 5A). As shown in FIG. 5A, the unit under test A1 does not overlap any one of the conductive units 111, and the unit under test A2 and A3 overlap the conductive unit 111. Meanwhile, the near field sensing device 12 may sense the units under test A1, A2 and A3. The units under test A1, A2 and A3 on the surface A of the object under test 13 may make the object under test 13 be sensed more easily. The signal intensity received by the near field sensing device 12 may be indicated by the receive signal strength indication (RSSI). When the near field antenna operates at 900 MHz, and utilizing the periodic guided-wave structure 11 in FIG. 3A, the maximum of RSSI (RSSI max.) for the units under test A1, A2 and A3 shown in FIG. 5A may be −32 dbm, −33 dbm and −37 dbm respectively. Meanwhile, the other units under test B3, D1, D2 and F2 (for example) may be −56 dbm, −52 dbm, −49 dbm and −55 dbm respectively.

Additionally, the near field sensing device 12 may further including a determining unit (not shown in the figure). The determining unit may be a micro controller unit (MCU). The determining unit may be electrically coupled to the near field antenna, and the determining unit may classify the units under test into a first group or a second group according to the magnitude (i.e., strength) of the near field magnetic field received from the units under test. The units under test adhered to the conductive units 111 may be classified into the first group, the units under test not adhered to the conductive units 111 may be classified into the second group. On the condition of FIG. 5A, the units under test may be divided into two groups. That is, the first group may include units under test A1, A2 and A3, and the second group may include other units under test (B3, D1, D2, F2 . . . etc.).

Referring to FIG. 5B, FIG. 5B shows another situation of the object under test staying on the periodic guided-wave structure 11. As shown in FIG. 5B, the unit under test A3 completely overlaps one of the conductive units 111, thus the unit under test A3 may not receive signals from the near field sensing device and may not transmit signals to the near field sensing device because of being sheltered by the overlapped conductive unit 111. The near field sensing device 12 may only sense the units under test A1 and A2. For the near field antenna operating at 900 MHz and utilizing the periodic guided-wave structure 11 in FIG. 3A, the RSSI maximum for the units under test A2 and A3 may be −49 dbm and −42 dbm respectively. Meanwhile, the other units under test on other surface of the dice (object under test 13) may not be sensed by the near field sensing device 12 (i.e., the RSSI max. for the other units under test may be very small or undetectable).

Referring to FIG. 5C, FIG. 5C shows another situation of the object under test staying on the periodic guided-wave structure 11. As shown in FIG. 5C, the units under test A1, A2 and A3 both overlap the conductive units 111. For the near field antenna operating at 900 MHz and utilizing the periodic guided-wave structure 11 in FIG. 3A, the RSSI maximum for the units under test A1, A2 and A3 may be −40 dbm, −33 dbm and −35 dbm respectively. Meanwhile, the other units under test on other surface of the dice (object under test 13) may not be sensed by the near field sensing device 12 (i.e., the RSSI max. for the other units under test may be very small or undetectable).

According to aforementioned description, when the object under test 13 is a dice, the near field sensing device 12 may determine which surface of the dice is the bottom surface according to the RSSI maximum of the units under test. Meanwhile, the top surface of the dice may be determined according to determined the bottom surface, thus the number shown on the top surface of the dice may be also determined. In other words, even if the near field sensing device 12 senses all of RFID tags of the dice, the near field sensing device 12 still could determine which surface of the dice is the top surface. Therefore, the recognition system 12 may be utilized to recognize the dice or chips in casino or gambling house, or be utilized to other related gambling recognition system.

Figure 6:
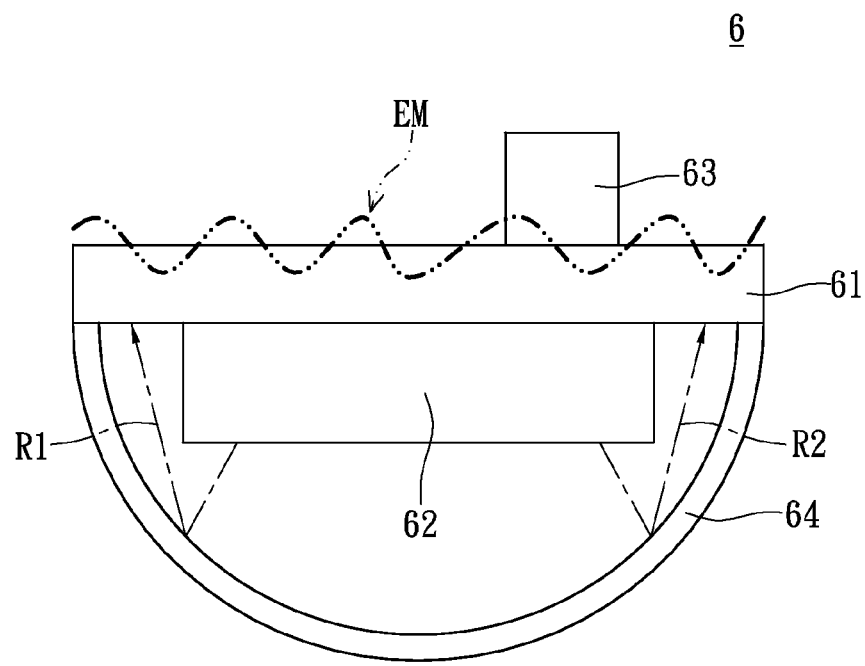
FIG. 6 shows a cross-sectional diagram of a recognition system according to another embodiment of the instant disclosure.

Please refer to FIG. 6, FIG. 6 shows a cross-sectional diagram of a recognition system 6 according to another embodiment of the instant disclosure. The recognition system 6 comprises a periodic guided-wave structure 61, a near field sensing device 62 and a conductive cover body 64. Please also note that in order to describe the instant disclosure in an understandable and clear way, the near field sensing device 62 sensing the units under test of one object under test 63 is described in this embodiment. The recognition system 6 may also sense a plurality of units under test on a plurality of objects under test 63. The mentioned unit under test may be a RFID tag, and the near field sensing device 12 may be a RFID reader.

Differing from the recognition system 1 in FIG. 1, the recognition system 6 further comprises the conductive cover body 64. The conductive cover body 64 may be disposed under the near field antenna of the near field sensing device 62. The conductive cover body 64 may have an opening (i.e., the opening towards the up direction of conductive cover body 64 with a shape of a bowl). The conductive cover body 64 may cover the near field antenna (also including the near field sensing device 62, as shown in FIG. 6) with the opening towards the periodic guided-wave structure 61. The conductive cover body 64 may reflect the electromagnetic field towards the down direction (which is the direction indicated by R1 and R2) produced by the near field antenna. Therefore, the electromagnetic field produced by the near field antenna may be concentrated to the upper half space for enhancing the reorganization ability of the near field sensing device 62.

Briefly, the recognition system having a periodic guided-wave structure may sense a plurality of units under test on the object under test. The periodic guided-wave structure may confine the electromagnetic field for facilitating to determine the distance from each of the units under test to the periodic guided-wave structure. Thus the units under test nearest to the periodic guided-wave structure may be easily sensed (or recognized). Additionally, the conductive cover body may be disposed under the periodic guided-wave structure and the near field sensing device for enhancing the electromagnetic field in the sensing direction (e.g., the upper half space).

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A recognition system utilized for sensing a plurality of units under test of an object under test:
    a periodic guided-wave structure, disposed under the object under test, having a plurality of conductive units periodically arranged on a plane;
    a near field sensing device, disposed under the periodic guided-wave structure, having a near field antenna, sensing the plurality of units under test through detecting the near field magnetic field for determining the distance from any one of the units under test to the periodic guided-wave structure.

2. The recognition system according to claim 1, wherein the conductive units are conductive bars in one-dimensional periodic arrangement.

3. The recognition system according to claim 2, wherein the operation frequency of the near field antenna is 900 MHz, the spacing between the conductive bars is from 2 millimeters to 2 centimeters.

4. The recognition system according to claim 1, wherein the conductive units are conductive grids in two-dimensional periodic arrangement.

5. The recognition system according to claim 1, wherein the conductive units are conductive patterns in two-dimensional periodic arrangement.

6. The recognition system according to claim 1, wherein the near field sensing device is a radio frequency identification (RFID) reader.

7. The recognition system according to claim 1, further comprising:
   a determining unit, electrically coupled to the near field antenna, classifying the units under test into a first group or a second group according to the magnitude of the near field magnetic field received from the units under test, wherein the units under test adhered to the conductive units are classified into the first group, the units under test not adhered to the conductive units are classified into the second group.

8. The recognition system according to claim 1, the magnitude of magnetic field produced by the near field antenna in the plane is larger than the magnitude of magnetic field produced by the near field antenna out of the plane.

9. The recognition system according to claim 1, wherein the periodic guided-wave structure furthering comprising:
   a substrate, a surface of the substrate supporting the conductive units.

10. The recognition system according to claim 1, further comprising:
   a conductive cover body, disposed under the near field antenna, having an opening, covering the near field antenna with the opening towards the periodic guided-wave structure.

* * * * *